(12) United States Patent
Bautz et al.

(10) Patent No.: US 11,806,644 B2
(45) Date of Patent: Nov. 7, 2023

(54) FILTER DEVICE

(71) Applicant: RT-FILTERTECHNIK GMBH, Friedrichshafen (DE)

(72) Inventors: Marco Bautz, Friedrichshafen (DE); Mathias Dieter, Saarbruecken (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 104 days.

(21) Appl. No.: 16/496,475

(22) PCT Filed: Apr. 4, 2018

(86) PCT No.: PCT/EP2018/058599
§ 371 (c)(1),
(2) Date: Sep. 23, 2019

(87) PCT Pub. No.: WO2018/189008
PCT Pub. Date: Oct. 18, 2018

(65) Prior Publication Data
US 2020/0030724 A1  Jan. 30, 2020

(30) Foreign Application Priority Data
Apr. 11, 2017  (DE) .................. 10 2017 003 489.3

(51) Int. Cl.
*B01D 29/96* (2006.01)
*B01D 29/23* (2006.01)
*B01D 35/147* (2006.01)

(52) U.S. Cl.
CPC ............ *B01D 29/96* (2013.01); *B01D 29/23* (2013.01); *B01D 35/147* (2013.01);
(Continued)

(58) Field of Classification Search
CPC ...... B01D 29/96; B01D 29/23; B01D 35/147; B01D 35/0276; B01D 35/306;
(Continued)

(56) References Cited

U.S. PATENT DOCUMENTS 8,753,415 B2    6/2014  Coulonvaux et al.
2004/0163371 A1*  8/2004  Reid .................... B01D 46/009
                                                55/495
(Continued)

FOREIGN PATENT DOCUMENTS

DE    10 2015 003 604       9/2016
EP         2 027 906         2/2009
(Continued)

OTHER PUBLICATIONS

International Search Report (ISR) dated Jul. 30, 2018 in International (PCT) Application No. PCT/EP2018/058599.

*Primary Examiner* — Liam Royce
(74) *Attorney, Agent, or Firm* — WENDEROTH, LIND & PONACK, L.L.P.

(57) ABSTRACT

A filter device has a housing (3, 5) and a filter element (23) that can be received in the housing in a replaceable manner. The housing and filter element engage with at least two key parts (53, 56, 58) or lock parts. The lock parts (57) or key parts of the housing (3, 5) are associated with each other respectively in pairs in an engaged manner, as a coding and/or setting and/or functional structure and/or reproduction protection.

15 Claims, 7 Drawing Sheets

(52) U.S. Cl.
CPC .............. *B01D 2201/295* (2013.01); *B01D 2201/4053* (2013.01); *B01D 2201/52* (2013.01)

(58) Field of Classification Search
CPC ...... B01D 2201/295; B01D 2201/4053; B01D 2201/52; B01D 2201/342
See application file for complete search history.

(56) References Cited

U.S. PATENT DOCUMENTS

| | | |
|---|---|---|
| 2009/0026124 A1 | 1/2009 | Schmitz et al. |
| 2010/0154372 A1 | 6/2010 | Bittle et al. |
| 2010/0155321 A1 | 6/2010 | Sasur et al. |
| 2013/0248464 A1 | 9/2013 | Schweitzer |
| 2016/0023142 A1 | 1/2016 | Arakeri et al. |
| 2018/0050285 A1* | 2/2018 | Klein .................. B01D 37/046 |

FOREIGN PATENT DOCUMENTS

| | | |
|---|---|---|
| WO | 2009/019442 | 2/2009 |
| WO | 2013/022834 | 2/2013 |
| WO | 2013/104790 | 7/2013 |

\* cited by examiner

FILTER DEVICE

FIELD OF THE INVENTION

The invention relates to a filter device having at least a housing and a filter element interchangeably accommodated therein.

BACKGROUND OF THE INVENTION

Filter devices of this type are state of the art and are used in a variety of designs and embodiments for the filtration of process fluids, hydraulic fluids such as hydraulic oils, liquid fuels and lubricants, for the treatment of liquid media and the like. Of the multitude of known filter devices, DE 10 2015 003 604 A1 shows an example of such a filter device, which is designed as an in-tank filter device. The reliability of such filter devices depends to a very large extent on the fact that, after replacement due to certain operating phases having elapsed, the installed or newly installed filter elements correspond exactly to the specifications, such as filter fineness, filter surface and other parameters. If the relevant filter device is equipped with an inappropriate filter element resulting in reduced or even no performance, that event can result in malfunction or even damage, in particular in expensive technical equipment, and can cause significant economic losses.

SUMMARY OF THE INVENTION

In view of this issue, the invention addresses the problem of providing a filter device that can be operated in a particularly operationally reliable manner.

According to the present invention, this object is basically achieved by a filter device characterized in that the filter element that can be interchangeably installed in the housing engages with at least two key or lock parts in correspondingly designed lock or key parts of the housing. The key or lock parts are used in pairs assigned to each other in engagement with each other as
- coding structure and/or
- fixing structure and/or
- operational structure and/or
- protection against unlicensed copies.

This coded key-lock system, which is based on the mechanical engagement of the filter element with the housing, ensures the highest level of operational reliability, because it eliminates multiple possible types of incorrect installation at the same time. The coding can represent the filter surface, the filter fineness and the differential pressure resistance, which precludes the use of filter elements having a performance that is unsuitable for the particular application. The same applies to the exclusion of filter elements having a filter material that is not suited to the particular purpose. The mechanical engagement of key parts with lock parts can form a rotation lock for the filter element as a fixing structure. Furthermore, the coding provides protection against the use of third-party products manufactured without license having specifications that are unsuitable for the respective purposes.

In particularly advantageous exemplary embodiments, the respective key or lock parts of the filter element are arranged on an annulus, which adjoins an end cap of the filter element and is preferably an integral part of the end cap. The housing for holding the annulus has a holder having the outer contour of this annulus.

Advantageously, the arrangement may in this case be such that the respective key or lock part of the annulus be a projecting or recessed parts of the equipment, which engage with recessed or projecting parts of the equipment of the holder of the housing holding the installed filter element and/or that in addition or alternatively, as a further key and/or lock part. The outer contour of the annulus and the holder of the housing, at least partially, follow a coordinated traverse line. In these embodiments, the installation of the filter element is prevented in the holder of the housing if the coding does not match.

In advantageous exemplary embodiments, the annulus is connected to one of the end caps via a web-shaped connecting device and protrudes in the axial and radial directions beyond the holder formed on the end cap for the element material.

With particular advantage, the annulus can be secured against the same or another annulus having differently shaped and/or arranged key or lock parts at the web-shaped connecting device of the filter element. As a result, end caps can be rationally manufactured as identical parts for filter elements having a wide variety of specifications and performance parameters and subsequently provided with the appropriate coding by attaching the annulus containing the coding in question.

Likewise, the holder of the housing, which is adapted to the shape of the annulus, can be interchangeably attached to the housing.

With particular advantage, the arrangement may be made such that the annulus of the filter element forms a closed outer ring, the outer peripheral side of which has the respective projecting or recessed key or lock parts or is implemented as a traverse line.

Advantageously, the annulus can form the upper seal of the filter device to the outside, by providing the free upper end face of the annulus with a sealing device having a cover part closing the housing as a part thereof. The cover part seals the interior of the filter device towards the environment, at least in this part of the system. Alternatively or additionally, a further sealing device may be present at the lower, free end face of the annulus, which seals the interior of a filter bowl as part of the housing towards the environment.

Projecting tabs may be provided on the annulus as key parts, which tabs can be accommodated in correspondingly formed, recessed tab holders in the holder of the housing.

For the differentiation of several types of filter elements, certain key and/or lock parts can be used as coding structures for one type of filter elements, which at least partially differ from key or lock parts of at least one further type of filter element. In this case, the corresponding lock and/or key parts of the holder of the housing may be present in a plurality such that at least two different types of filter elements can be accommodated in the same housing.

As fixing structure, the key or lock parts of the replaceable filter element can engage with the correspondingly formed lock or key parts on the housing in such a way that an axially and/or radially secured position of the filter element in the housing is obtained.

With particular advantage, functional structures for the transmission of fluid, energy or information can be used, preferably in the form of lines or line sections that are routed via individual key or lock parts of the filter element and/or its end cap and which take over the function of connecting parts, also in the shape of plug and socket parts. For example, provision can be made to transmit the differential pressure present at the filter element to a pressure-measuring device via lines, line sections or connector parts.

As protection against unlicensed copies, the key and/or lock parts of the housing permit only the installation of filter elements having correspondingly formed lock or key parts. Furthermore, at least two different structures may be provided for one filter element, such as a functional structure and a fixing structure. Also, a structure of the filter element whose contour looks the same can perform several tasks, such as that of a coding structure, a retaining structure, a functional structure or a structure for protection against unlicensed copies.

The object of the invention is also a filter element, which is provided in particular for a filter device according to the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
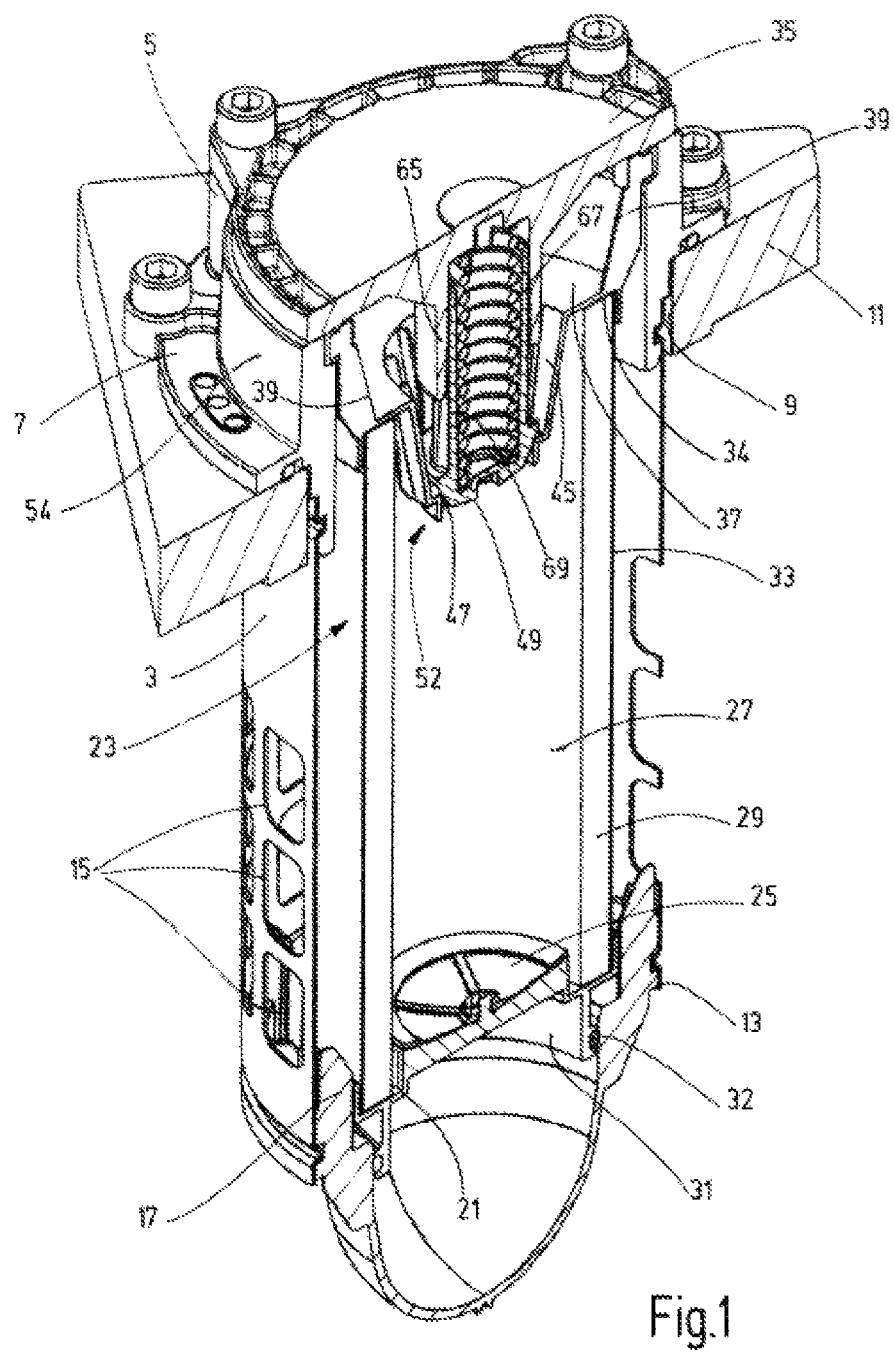
FIG. 1 is a perspective view, in section in the vertical center plane, of a filter device according to a first exemplary embodiment of the invention.

With reference to the accompanying drawings, the invention is illustrated using the example of an in-tank filter device. The casing has a housing 3 in the form of a relatively thin-walled, hollow circular cylinder, which adjoins the lower end of a filter head 5. At the outside of filter head 5 there is a mounting flange 7, which can be used to mount the filter head 5 at the edge of an opening 9 on the upper wall 11 of a tank, otherwise not shown, such that the housing 3 extends into the interior of the tank in the vertical direction. The length of the housing 3 is dimensioned such that the lower end 13 is located in the area of the lowest fluid level to be expected in operation. In the longitudinal range adjoining the lower end 13, the housing 3 is provided with penetrations or openings 15, of which only a few are numbered in FIG. 1. At the lower end 13, the housing 3 is connected, in particular crimped, to an annular body 17 that adjoins a connecting piece 19, cf. FIGS. 2 and 3. Connecting piece 19 forms the unfiltered input for the operation of the device, which unfiltered input is routed through the wall of the tank (not shown) to the outside.

The annular body 17 forms on its inner side the element holder for the lower end cap 21 of a filter element 23. This end cap 21 has a central passage 25 through which in operation the unfiltered matter flowing in via the connecting piece 19 reaches the inner filter cavity 27. Inner filter cavity 27 is encompassed by the hollow cylinder of a filter material 29 and forms the unfiltered side. For the sealing of the filtered side towards the outside of the filter material 29, which forms the filtered side, the lower end cap 21 has a downwardly projecting, annular neck 31 on which a sealing annulus 32 forms the seal at the annular body 17.

Figure 2:
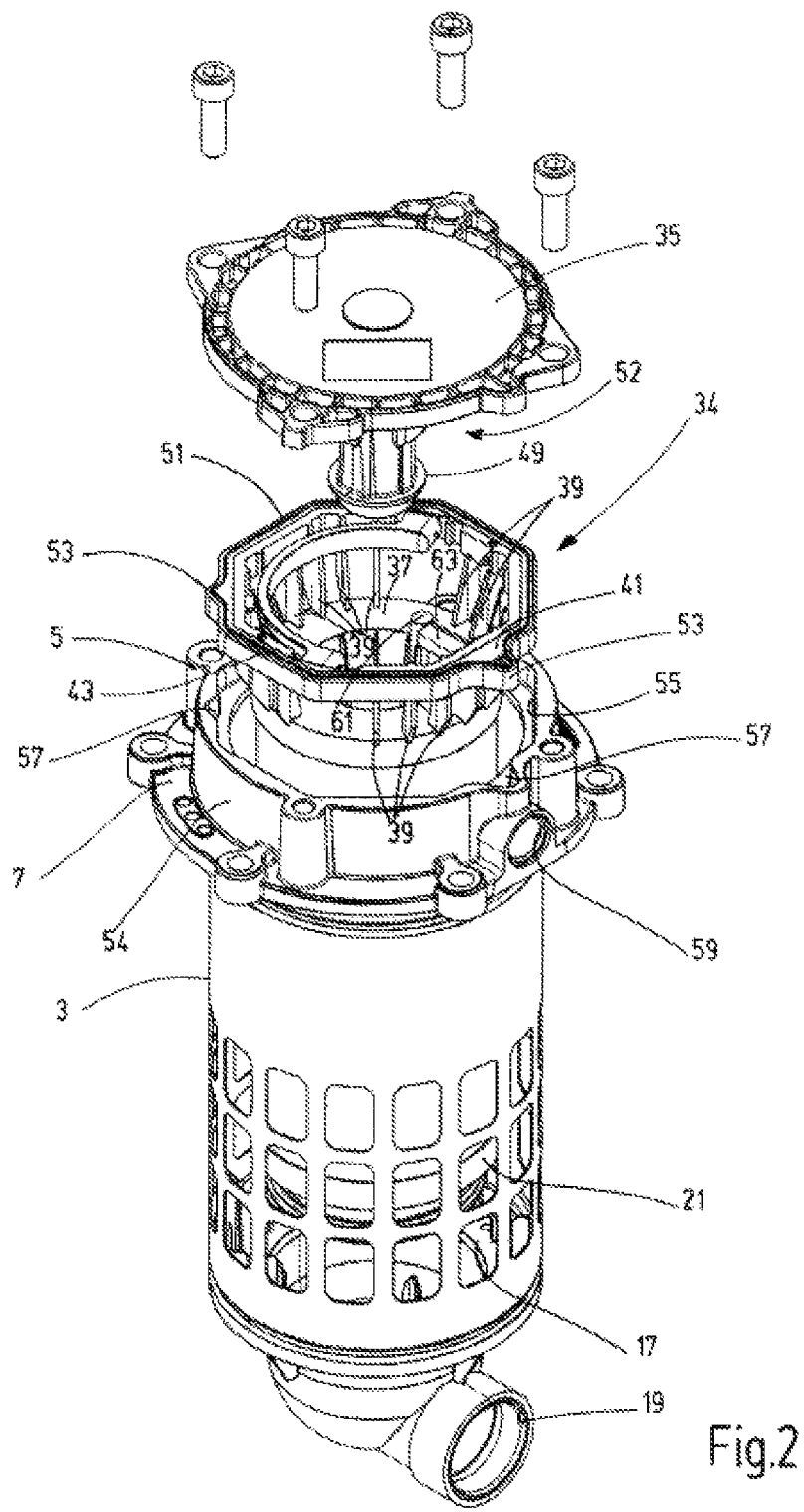
FIG. 2 is an exploded perspective view of the filter device of FIG. 1.
Figure 3:
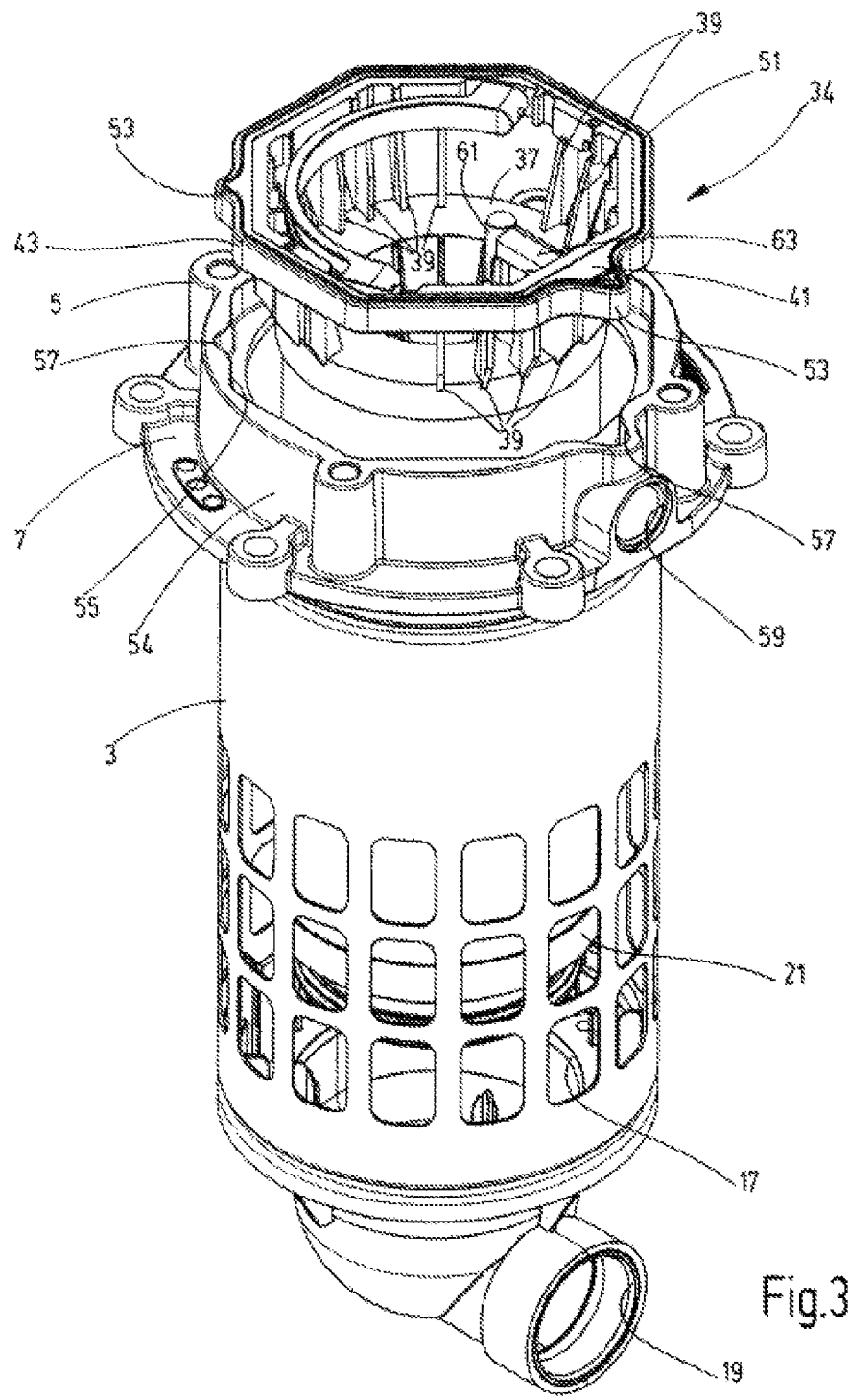
FIG. 3 is a perspective view drawn on a larger scale, in which the exemplary embodiment of FIG. 1 is shown without a cover part and with only partially inserted filter element.
Figure 6:
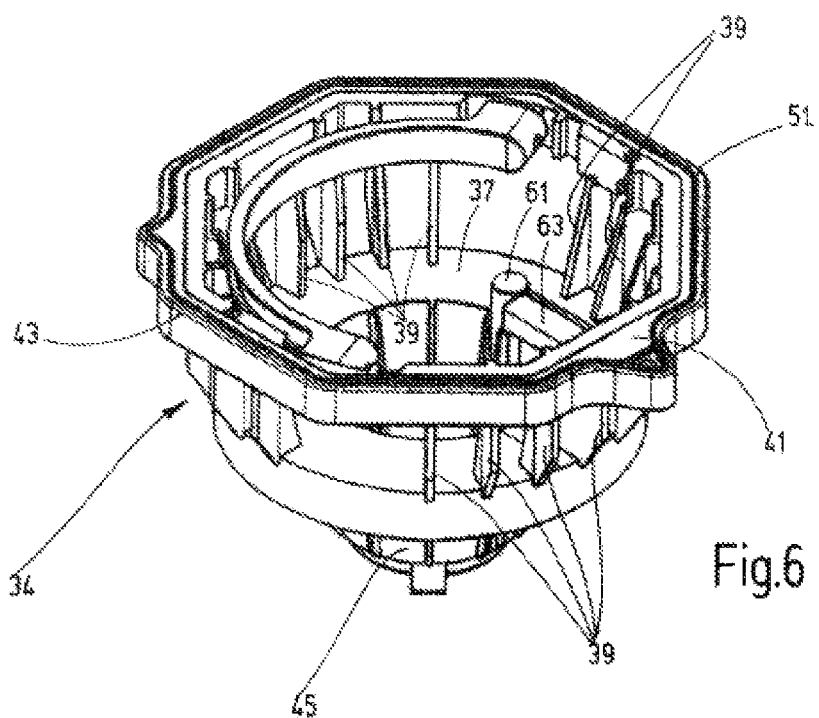
FIG. 6 is a perspective view of a separately shown end cap of the filter element of FIG. 5.

An upper end cap 34 is provided as an enclosure for the upper end of the filter material 29. The outside of filter material 29 is encompassed by a perforated support tube 33. The filter element 23 is shown separately in FIG. 6. The filter head 5 encompassing the upper end cap 34 forms on its inside the holder for the mutual engagement of equipment provided at the head 5 and at the end cap 34. As shown in FIGS. 1 and 2, a cover part 35, which can be screwed to the filter head 5, forms the upper end of the device towards the outside.

The construction of the end cap 34 largely corresponds to the end cap 43 shown in the document DE 10 2015 003 604 A1 mentioned above, which is injection-molded from a plastic material. The essential difference is the different configuration of the upper peripheral section of the end cap 34, which is referred to as an annular receiving crown 49 in that document. In accordance with that known solution, the end cap 34 as a central component has a planar annular part 37, which forms the enclosure for the upper end of the hollow body of the filter material 29 adjoining the underside of the annular part 37. The outer circumference of the annular part 37 encompasses an annulus of distributed plate-shaped webs 39, the planes of which extend in the radial direction and which form the supports for an upper, non-circular wall section 41. More specifically, in this example the non-circular wall section 41 extends along an octagonal traverse line. It bears an annulus 43 on its outer circumference, on which system parts are located, in the manner of a coding, which form key parts for a key/lock system. On the underside of the annular part 37, the annular part 37 adjoins a guide part 45 at the inner circumference of the annular part. The guide part 45 has the shape of a hollow cone extending coaxially into the interior of the filter cavity 27. At its tapered end, this conical body has an opening 47. The rim of opening 47 forms the sealing surface for a valve body 49 of a bypass valve 52 (FIG. 2), which will be discussed later.

On the outside of the wall section 41, the annulus 43 forms a closed outer ring, which has a sealing device 51 at its upper, free end face, which extends in a radial plane. The sealing device seals the filter housing 3 towards the outside by contact to the filter housing 3 if the filter element 23 is installed in the functional position and if the cover part 35 is attached to the filter head 5. Preferably, a further, continuously extending sealing device (not shown) is arranged on the lower, free end face of the annulus 43, which preferably extends in parallel to the first annular sealing device 51. The sealing device also seals the interior of the bowl-shaped housing 3, 5 via the free end face thereof towards the environment.

Figure 4:
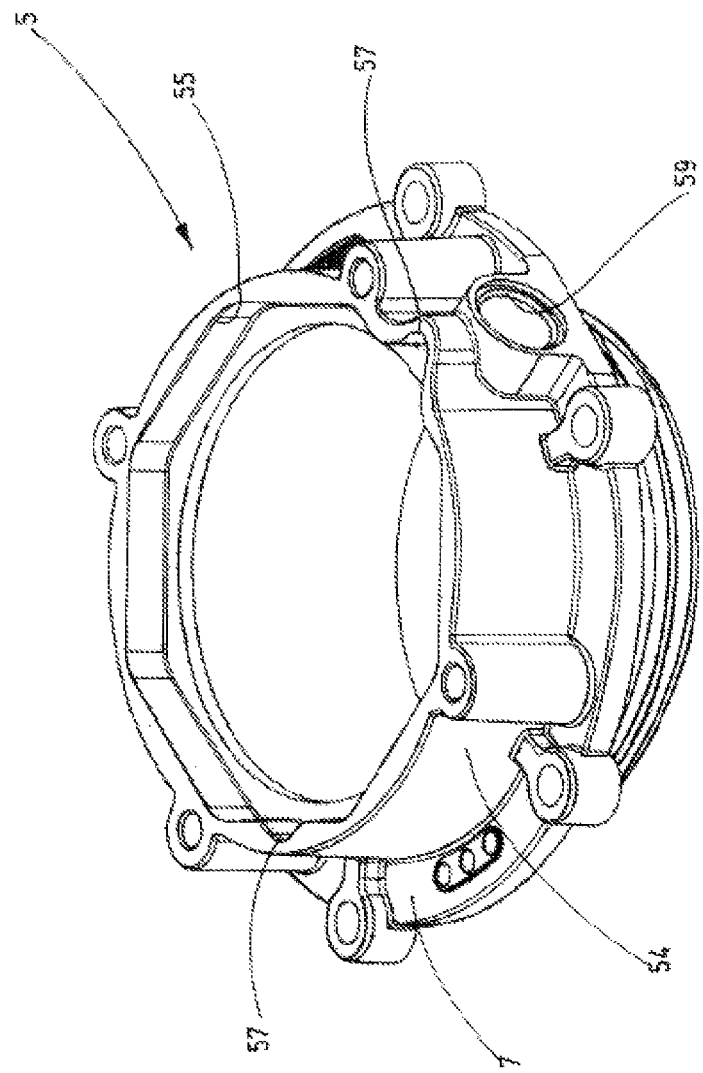
FIG. 4 is a perspective view of a housing head shown separately, which forms the holder of a filter element and a part of the housing of the filter device of FIG. 1.
Figure 5:
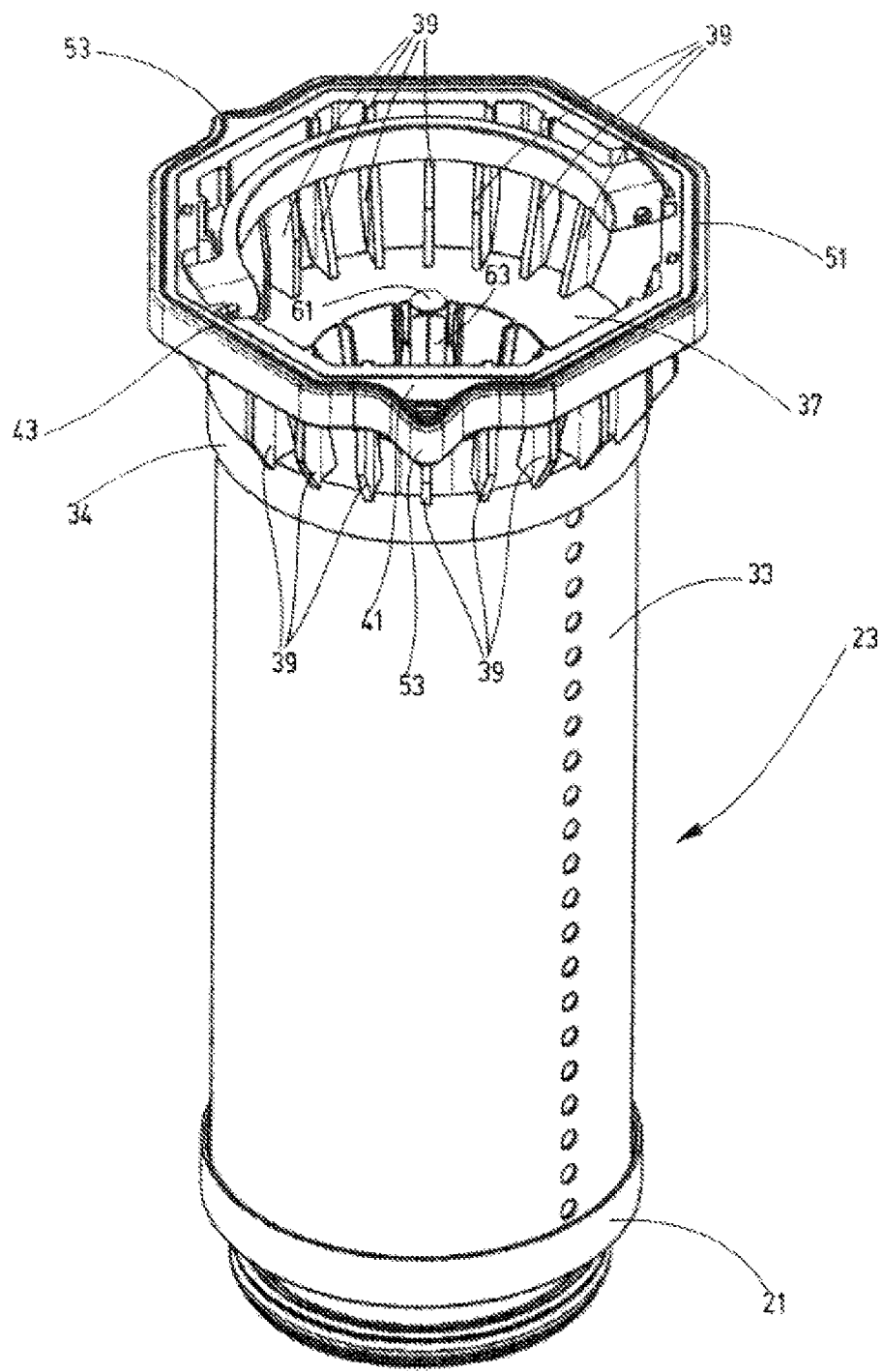
FIG. 5 is a perspective view of an embodiment of a filter element for use in the filter device according to the invention.
Figure 7:
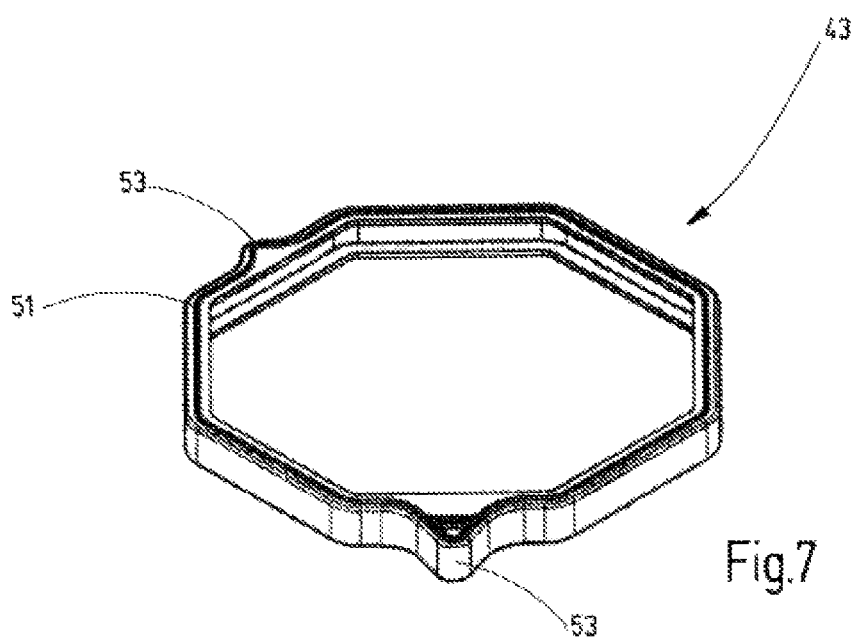
FIG. 7 is a perspective view of an annulus provided with coded key parts, which annulus can be secured to one of the end caps of a filter element according to an exemplary embodiment of the invention.

As equipment that forms coded key parts, projecting tabs 53 are provided on the outer circumference in the radial direction of the annulus 43. The filter head 5 forms a holder 55 (cf. in particular FIG. 4) on the inside of a wall part 54 open at the top, which is located above the mounting flange 7, for the annulus 43 of the end cap 34. As lock parts for the engagement of the tabs 53 of the annulus 43, recessed tab holders 57 are formed in the inner wall in the holder 55. As another coded lock part, the inner wall of the holder 55 is non-circular and follows the outer shape of the annulus 43 in the form of the octagonal polygon in the example shown. In the exemplary embodiment shown, two tabs 53 are provided on the annulus 43 (FIG. 7), to which two tab holders 57 are assigned in the holder 55 of the filter head 5. One tab holder 57 is aligned with a lateral wall opening 59 provided in the wall part 54 of the filter head 5 and which has a female thread. In a corresponding manner, as shown in the known filter device in FIG. 4 of that document, a differential pressure measuring device (not shown) can be screwed into the opening 59 in such a way that the pressure of the filtered side is present at one of its measurement inputs. The transmission of the current pressure at the unfiltered side to the other measurement input of the differential pressure measuring device is performed in the same manner as in the solution shown in the document mentioned using lines and line sections in the end cap 34 inserted into the holder 55 of the filter head 5. The lines 60 and 61 in the known solution (cf. FIG. 3) of the end cap there are routed from the inner filter cavity, where the pressure of the unfiltered side is present, to a radially projecting wall part, which is used to transmit the current pressure to the measuring device. In this invention, this function of transmitting the instantaneous pressure is taken over by the tab 53, belonging to the coding, which is assigned to the tab holder 57 that is flush with the connection opening 59. In this tab holder 57, a connecting channel not visible in the drawing is formed, which is routed to the measurement input of the current pressure on the unfiltered side. The line sections 61, 63 of the end cap 34 transmitting this current pressure, which are visible in FIGS. 2, 3 and 5 and 6.

As can be seen from FIGS. 1 and 2, the bypass valve 52 is arranged on the cover part 35. It has a coaxial guide cylinder 65 on its underside, in which cylinder the hollow shaft 67 of the valve body 49 is guided in an axially mobile manner. A compression spring 69 is located in the hollow shaft 67, which pre-stresses the valve body 49 such that it abuts the cone body forming the guide part 45 at the rim of the opening 47 when the cover part 35 is attached the filter head 5. If the current pressure of the unfiltered side in the cavity 27 exceeds the closing pressure, the bypass valve 52 opens the fluid path to the inside of the cone body of the end cap 34 and via the gaps between the webs 39 to the filtered side.

Figure 8:
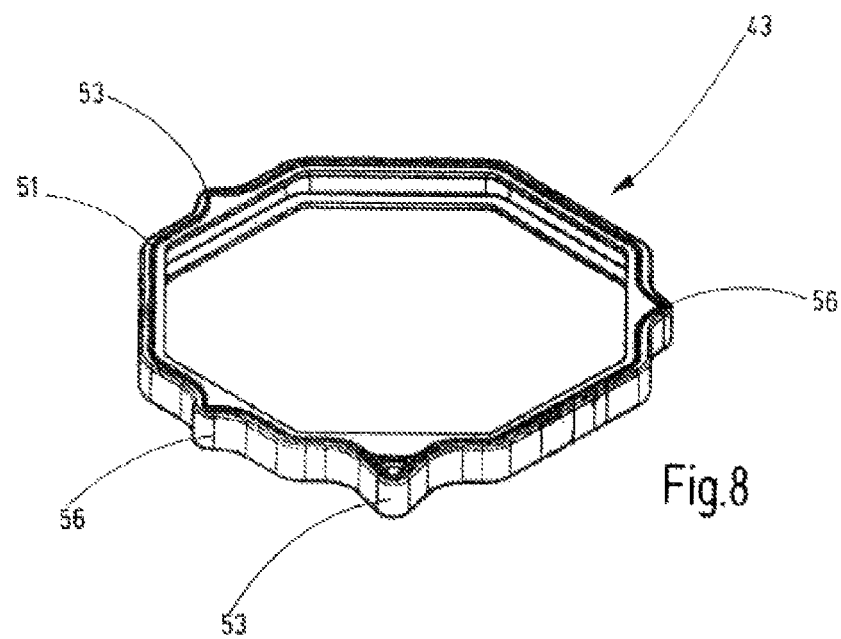
FIGS. 8 and 9 are perspective views of the annulus provided with different codings.
Figure 9:
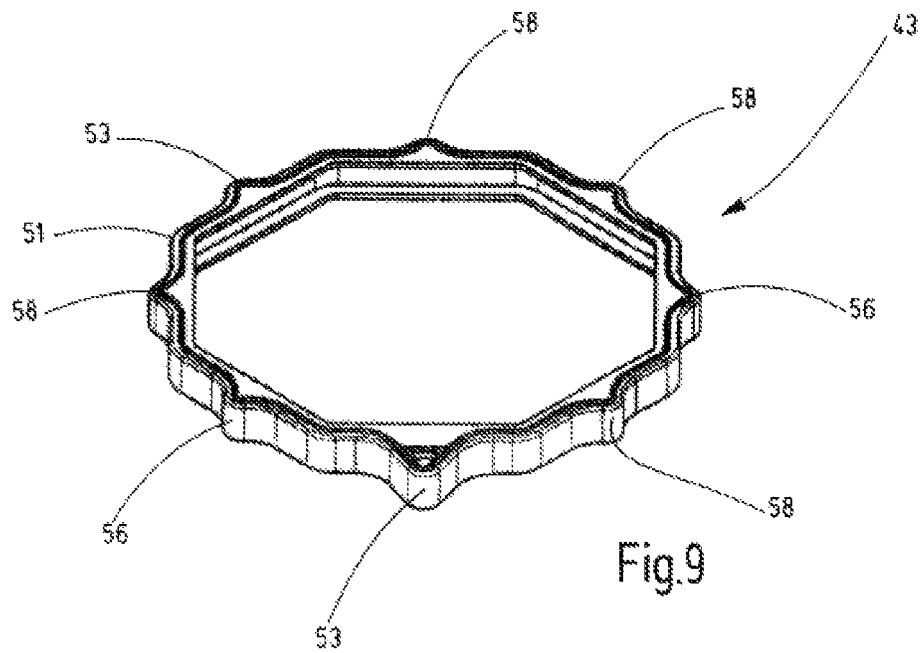

While FIGS. 1 to 7 show the coding example based on only two tabs 53, of which the one (bottom in FIG. 7) tab 53 serves as a functional part for transmitting the current pressure of the unfiltered side, with an octagonal traverse line of the outer periphery of the collar 43 forming another coding, it should be understood that a virtually unlimited variety of codings is possible. By way of example, FIG. 8 shows the annulus 43, which in addition to the tabs 53, one of which simultaneously forms a functional structure, has two additional tabs 56, which are arranged in the circumferential direction at different distances from each other. FIG. 9 shows an example, in which four further tabs 58 are provided. Again, a tab 53 forms a functional structure. The holder 55 in the filter head 5 is provided with two tab holders 57 in the example shown. The filter heads 5 may be provided with tab holders of a number such that in the same holder 55 a plurality of different types of filter elements 23 can be accommodated, which are provided with a smaller number of tabs 53, 56, 58, but have the permissible coding. The coding system provided in the invention not only prevents the incorrect installation of the filter device, but also forms a form-locking rotation lock for the installed filter elements 23.

Because the respective sealing devices 51 used follow the shape of the key parts, which protrude like a tab and integrally protrude from the outer circumference of the annulus 43, the sealing effect would be lost immediately if one of the key parts were to break off. In this way, looming malfunctions in the operation of the filter device can be seen from the start, but also later on.

While various embodiments have been chosen to illustrate the invention, it will be understood by those skilled in the art that various changes and modifications can be made therein without departing from the scope of the invention as defined in the claims.

The invention claimed is:

1. A filter device, comprising:
   a filter housing having at least two housing key parts, a holder interchangeably attached to the filter housing and a cover plate closing an open end of the filter housing;
   a filter element being received in the filter housing and having at least two element key parts that mate with the housing key parts to provide at least one of a coding, a fixing, an operation or protect against unlicensed filter element copies, the element key parts being arranged on an annulus mounted on an end cap of the filter element, the holder of the filter housing having an inner contour conforming to and receiving the annulus; and
   a seal on a free end face of the annulus engaging the cover part and sealing an interior of the filter housing from an environment surrounding an exterior of the filter housing.

2. The filter device according to claim 1 wherein the annulus is an integral part of the end cap.

3. The filter device according to claim 1 wherein the element key parts comprise at least one of projecting or recessed parts of the annulus and engage recessed or projecting parts forming the housing key parts.

4. The filter device according to claim 1 wherein an outer contour of the annulus and an inner contour of the holder follow a coordinated traverse line.

5. The filter device according to claim 1 wherein the annulus is connected to the end cap via a connecting web and protrudes in axial and radial directions beyond a holder of the end cap receiving filter material of the filter element.

6. The filter device according to claim 5 wherein the connecting web is capable of being made for connecting to annuluses with different element key configurations.

7. The filter device according to claim 1 wherein the seal follows shapes of the annulus and the element key parts on the annulus.

8. The filter device according to claim 1 wherein the annulus comprises a closed outer ring with an outer peripheral side having the element key parts projecting from or recessed in the outer peripheral side.

9. The filter device according to claim 1 wherein the element key parts comprise projecting tabs extending from the annulus and being received in the housing key parts correspondingly formed as recessed tab holders in the holder of the filter housing.

10. The filter device according to claim 1 wherein
the element key parts with at least two different configuration is capable of being accommodated with the housing key parts as coding such that at least two different types of filter elements can be accommodated in the filter housing to provide the coding.

11. The filter device according to claim 1 wherein
engagement of the element key parts and the housing key parts axially and radially secure the filter element in the filter housing to provide the fixing.

12. The filter device according to claim 1 wherein
lines capable of transmitting fluid, energy or information have sections routed via at least one of the element key parts or via the end cap and are in shapes of plugs and socket parts to provide the operation.

13. The filter device according to claim 3 wherein
the housing key parts only allow installation of a filter element with the key parts that correspond to the housing key parts to provide the protection against unlicensed copes of filter elements.

14. The filter device according to claim 1 wherein
at least two different types of element key parts are provided on the annulus; and
at least two different types of housing key parts are provided in the holder of the filter housing.

15. The filter device according to claim 1 wherein
the element key parts having same contours performs at least two of the coding, the fixing, operation and protection against unlicensed copies.

* * * * *